(12) United States Patent
Akao et al.

(10) Patent No.: US 6,997,169 B2
(45) Date of Patent: Feb. 14, 2006

(54) FLUID VALVE ASSEMBLY

(75) Inventors: Yoshiyuki Akao, Tokyo (JP); Shigeru Matsuo, Tokyo (JP)

(73) Assignee: Mitsubishi Fuso Truck and Bus Corporation, (JP)

( * ) Notice: Subject to any disclaimer, the term of this patent is extended or adjusted under 35 U.S.C. 154(b) by 0 days.

(21) Appl. No.: 10/937,744

(22) Filed: Sep. 9, 2004

(65) Prior Publication Data
US 2005/0098164 A1     May 12, 2005

(30) Foreign Application Priority Data
Sep. 9, 2003     (JP)     ............................. 2003-317162

(51) Int. Cl.
*F02B 47/08*     (2006.01)
(52) U.S. Cl. ............................. 123/568.24; 123/568.21
(58) Field of Classification Search .......... 123/568.24, 123/568.23, 568.26, 568.21
See application file for complete search history.

(56) References Cited

U.S. PATENT DOCUMENTS 5,599,003 A * 2/1997 Seemann et al. ........ 251/30.03
5,937,835 A * 8/1999 Turner et al. .......... 123/568.24
6,178,956 B1 * 1/2001 Steinmann et al. ..... 123/568.21

FOREIGN PATENT DOCUMENTS

JP     59-215956 A     12/1984
JP     5-187328 A     7/1993

* cited by examiner

*Primary Examiner*—Mahmoud Gimie
(74) *Attorney, Agent, or Firm*—Rossi, Kimms & McDowell, LLP

(57) ABSTRACT

To protect a drive unit in a fluid valve assembly from impurities over a long term by preventing entrance of such impurities to the drive unit, a seal structure the sealing performance of which is hardly reduced is adopted around a moving part of the fluid valve assembly. The fluid valve assembly is provided with a valve member displaceably arranged in a flow passage through which a fluid is allowed to pass, a drive unit arranged outside the flow passage, a connecting member extending through a bore formed in a wall of the flow passage and connected at its end thereof to the valve member and at its opposite end to the drive unit, and a seal member arranged in gas- or water-tight relations with the wall of the flow passage and the connecting member and made of a flexible material such that the seal member does not interfere with a displacement of the valve member when the valve member is driven by the drive unit.

14 Claims, 5 Drawing Sheets

FLUID VALVE ASSEMBLY

BACKGROUND OF THE INVENTION a) Field of the Invention

This invention relates to a fluid valve assembly for regulating the flow rate of a fluid or for a like purpose. Between a valve member and a drive unit for driving the valve member, the fluid valve assembly is provided with a seal structure that prevents entrance of the fluid from a flow passage, in which the valve member is arranged, to the side of the drive unit. In particular, the present invention is concerned with such a fluid valve assembly suitable for use in a valve unit of an exhaust gas recirculation system for recirculating to an intake side an exhaust gas emitted from an internal combustion engine such as an automotive vehicle.

b) Description of the Related Art

A fluid valve assembly which functions to regulate the flow rate of a fluid is provided with a drive unit for driving a valve member. Conventional fluid valve assemblies include those provided with drive units for driving their valve members, respectively. In each of such conventional fluid valve assemblies, there is a slide contact area between the valve member and a valve seat supporting the valve member thereon and defining an orifice of a flow passage therethrough. With the slide contact area serving as a boundary, its drive unit is arranged on an outer side of the flow passage. In some applications, it is desired to protect the drive unit from the fluid or from impurities contained in the fluid. Such fluid valve assemblies include, for example, exhaust gas recirculation control valves (hereinafter simply called "EGR (Exhaust Gas Recirculation) valves" for the sake of brevity).

An EGR valve is used in an exhaust gas recirculation system for an internal combustion engine such as an automotive vehicle, and is arranged to inhibit the occurrence of harmful components in an exhaust gas by recirculating an appropriate amount of the exhaust gas to an intake side in accordance with a state of running of an automotive vehicle or the like.

This EGR valve is effective not only for a gasoline engine but also for a diesel engine to lower NOx (nitrogen oxides) in an exhaust gas. In the case of a diesel engine, however, the setting of the amount of an exhaust gas, which is to be recirculated (hereinafter called "the amount of the EGR gas"), at an excessively large value induces an increase in the content of PM (particulate matter) in the exhaust gas, while the setting of the amount of the EGR gas at an unduly small value is unable to sufficiently lower the content of NOx in the exhaust gas.

It is, therefore, necessary to perform an accurate control on the amount of an EGR gas (hereinafter called "EGR flow rate control"). This EGR flow rate control is generally performed by adjusting the opening of an EGR valve. As EGR valves, motor-driven EGR valves have been developed in recent years with a view to making improvements in the accuracy of control although pneumatic, pressure differential EGR valves making use of a positive pressure or a negative pressure are still in common use.

A motor-driven EGR valve is high in the accuracy of control, and has made it possible to properly control the EGR flow rate. Nonetheless, the entrance of impurities such as SOx, unburned fuel components and soot to the interior of the motor develops inconveniences such as corrosion and sticking motor, and in the worst case, involves a potential problem of a stall of the motor.

Described specifically, an EGR valve is arranged in an exhaust gas passage so that a poppet valve, butterfly valve or the like, which constitutes the EGR valve, is exposed to an exhaust gas. A motor which serves to drive the EGR valve is connected to such a poppet or butterfly valve or the like, and therefore, is in an environment where the exhaust gas can easily enter the interior of the motor. In particular, the exhaust gas is higher in pressure than the atmospheric pressure and is also high in temperature, so that the exhaust gas tends to enter the interior of the motor.

There is, accordingly, a need for a structure that prevents the exhaust gas from entering the interior of the motor.

As a conventional structure for preventing the entrance of an exhaust gas or the like to the side of a motor in a motor-driven EGR valve, there is, for example, a structure such as that illustrated in FIG. 5.

As depicted in FIG. 5, this EGR valve is provided with an exhaust gas passage 11 as a part of an exhaust gas recirculation passage, a valve element 12 interposed as a valve member in the exhaust gas passage 11 at an intermediate location thereof, an electric motor 13 adapted as a drive unit to drive the valve element 12 in an axial direction via a valve shaft 14 of the valve element 12, a bearing 15 supporting thereon the valve shaft 14 of the valve element 12, and a casing 16 with the bearing 15 and valve shaft 14 accommodated therein. When the electric motor 13 is rotated, the valve element 12 is driven in the axial direction via a translation mechanism (not shown), which translates the rotation of the electric motor 13 to an axial motion, so that the exhaust gas passage 11 can be opened or closed or its opening can be adjusted.

Between an inner circumferential wall of the casing 16 and an outer circumferential wall of the valve shaft 14, a resin-made seal diaphragm 17 is interposed. This seal diaphragm 17 is in a substantially funnel-shaped form. Its outer circumferential portion is secured in a gas-tight fashion on the inner circumferential wall of the casing 16, while its inner circumferential portion is maintained in sliding contact with the outer circumferential wall of the valve shaft 14. Under a condition that the pressure of an EGR gas is higher than the atmospheric pressure, the seal diaphragm 17 is caused to expand like a kite by the pressure of the EGR gas as shown in FIG. 5 so that its sealing performance is increased at a slide contact area between its inner circumferential portion and the outer circumferential wall of the valve shaft 14.

JP-A-5-187328, on the other hand, discloses a technique that provides an EGR valve with an impurities entrance blocking means, although the EGR valve is not of the motor-driven type but is of the pressure differential type.

As illustrated in FIG. 6, this EGR valve is provided with an exhaust gas passage 101, a valve element 102 interposed in the exhaust gas passage 101 at an intermediate location thereof, a diaphragm 103 to which the valve element 102 is connected, and a negative pressure chamber 104 for driving the valve element 102 in cooperation with the diaphragm 103. By depressurizing the negative pressure chamber 104, the valve element 102 is caused to move upward as viewed in FIG. 6, whereby a pintle 112 of the valve element 102 is separated from a valve seat 105 to open the exhaust gas passage 101. By releasing the reduced pressure in the negative pressure chamber 104, on the other hand, the valve element 102 is caused to move downwardly by a return spring 106 as viewed in FIG. 6 so that the pintle 112 is brought into close contact with the valve seat 105 to close the exhaust gas passage 101.

A valve shaft 107 of the valve element 102, which is a movable member, is provided with a shield plate 108, and an impurities blocking member 110 is arranged between the valve shaft 107 and a guide member 109 through which the valve shaft 107 extends and slidingly reciprocates up and down.

Opposing the guide member 109, the shield plate 108 is fixedly secured on an approximately central part of the valve shaft 107 as viewed in the longitudinal direction. This shield plate 108 has an outer diameter dimensioned slightly smaller than an inner diameter of a cavity 111, and can prevent an exhaust gas, which is passing through the exhaust gas passage 101, from flowing to the side of the guide member 109 and can also reduce a radiation of heat from the exhaust gas toward the side of the guide member 109.

The impurities blocking member 110 has approximately U-shaped configurations as viewed in cross-section, and its inner and outer surfaces are formed with corrugations such that it is provided with high elasticity and is facilitated to undergo flexible deformations. As the material of the impurities blocking member 110, a flexible, fluorinated resin is used for its excellent heat resistance and flexibility and its high abrasion resistance. The impurities blocking member 110 is provided at an upper circumferential edge thereof with a flange portion 110*a* molded integrally with the impurities blocking member 110, and at a lower end portion thereof with an opening 110*c*. The impurities blocking member 110 is disposed, with its flange portion 110*b* being fitted in an annular groove 111*a* formed adjacent the cavity 111 such that its upper surface is maintained in close contact with the guide member 109, and with its lower end portion 110*b* being positioned close to the shield plate 108 and its opening 110*c* being fixedly secured on the outer circumferential wall of the valve shaft 107.

As readily appreciated from the foregoing description, the impurities blocking member 110 is arranged between the guide member 109 and the shield plate 108 and, even when the valve element 102 is in its open position, shields, in other words, covers the guide member 109, including a slide contact area between an axial bore 109*a* and the valve shaft 107, in a shielded state to maintain gas tightness, so that soot and the like in the exhaust gas are prevented from entering the side of the guide member 109.

However, the above-described conventional art is accompanied with problems as will be described next.

In the case of the first conventional art depicted in FIG. 5, there is the slide contact area between the inner circumferential portion of the seal diaphragm 17 and the outer circumferential wall of the valve shaft 14. As the use of the EGR valve goes on, the seal diaphragm 17 hence wears out at the slide contact area so that the sealing performance is progressively lowered.

As a consequence, the exhaust gas which has entered through the slide contact area between the valve shaft 14 and the bearing 15 (see arrows A1,A2) is allowed to enter the side of the electric motor 13 through the slide contact area between the inner circumferential wall of the seal diaphragm 17 and the outer circumferential wall of the valve shaft 14 (see arrows A3). As the EGR valve is used for a longer time, the abrasion wear of the seal diaphragm 17 increases, eventually resulting in a potential problem that the seal diaphragm 17 may fail to exhibit its sealing function and the motor 13 may be damaged accordingly. Even when an abrasion-resistant material such as polytetrafluoroethylene, for example, "TEFLON" (registered trademark) is used for the seal diaphragm 17, it is still difficult to inhibit the reduction in sealing performance.

In the case of the second prior art illustrated in FIG. 6, on the other hand, such a slide contact area is included at neither the inner circumference nor the outer circumference of the impurities blocking member 110. Taking a look at the inner circumference of the impurities blocking member 110, however, the lower end portion 110*b* is fixedly secured only at an edge portion of the opening 110*c* on the outer circumferential wall of the valve shaft 107. There is, accordingly, a potential problem that the inner circumference of the impurities blocking member 110 may separate from the outer circumferential wall of the valve shaft 107 by the high-pressure, high-temperature EGR gas. Once such separation takes place, the impurities blocking member 110 can no longer exhibit its sealing function, leading to a potential problem that the motor may be damaged.

These problems are not limited to EGR valves, but may occur on any of various valves insofar as they include in the proximity of a movable member a drive means which should be protected from a fluid or from impurities or the like in a fluid (a means corresponding to an EGR valve drive motor).

SUMMARY OF THE INVENTION

The present invention has been created in view of the above-mentioned problems, and has as an object thereof the provision of a fluid valve assembly in which the entrance of impurities to a drive unit to be protected can be prevented over along term by adopting around a movable member a sealing structure the sealing performance of which is hardly reduced.

In one aspect of the present invention, there is provided a fluid valve assembly comprising:

a valve member displaceably arranged in a flow passage through which a fluid is allowed to pass;

a drive unit arranged outside the flow passage;

a connecting member extending through a bore formed in a wall of the flow passage, and connected at an end thereof to the valve member and at an opposite end thereof to the drive unit; and a seal member arranged in gas- or water-tight relations with the wall of the flow passage and the connecting member and made of a flexible material such that the seal member does not interfere with a displacement of the valve member when the valve member is driven by the drive unit.

When the connecting member undergoes a displacement as a result of a displacement of the valve member driven by the drive unit, the fluid or impurities in the fluid may leak out from the side of the end (which may hereinafter be called "the lower end") of the connecting member (i.e., the side of the valve member) to the side of the opposite end (which may hereinafter be called "the upper end") of the connecting member (i.e., the side of the drive unit). This fluid or these impurities in the fluid are, however, prevented from entering the side of the drive unit by the seal member arranged in the gas- or water-tight relations with the wall of the flow passage and the connecting member and made of the flexible material. It is, therefore, possible to protect the drive unit from the fluid or the impurities in the fluid over a long term.

Preferably, the fluid valve assembly may further comprise a communication hole formed such that an interior of the flow passage, said interior facing the seal member, is kept in communication with an exterior of the flow passage.

The communication hole can be formed, for example, through the wall of the flow passage at a location between a bearing, on and along which the connecting member is slidably supported, and the seal member.

For example, the flow passage can be an exhaust gas recirculation passage for recirculating an exhaust gas of an internal combustion engine to an intake side, the valve member can be an exhaust gas recirculation valve capable of adjusting a flow rate of the exhaust gas through the exhaust gas recirculation passage, and the drive unit can be an electric motor for displacing the exhaust gas recirculation valve.

Preferably, the seal member can be held in place between a step portion of a large-diameter section arranged on an inner circumferential surface of the wall and an end face of a fitted member fitted in the large-diameter section. Alternatively, the seal member can be held in place between two ring-shaped members fitted in an annular groove formed in an inner circumferential surface of the wall.

In another aspect of the present invention, there is also provided a method for manufacturing a fluid valve, which comprises:

displaceably arranging a valve member in a flow passage through which a fluid is allowed to pass;

arranging a drive unit outside the flow passage;

arranging a connecting member to extend through a bore formed in a wall of the flow passage, and connecting the connecting member at an end thereof to the valve member and at an opposite end thereof to the drive unit; and arranging a seal member in gas- or water-tight relations with the wall of the flow passage and the connecting member such that the seal member does not interfere with a displacement of the valve member when the valve member is driven by the drive unit.

According to the manufacturing method, it is possible to efficiently manufacture with high accuracy the above-described fluid valve assembly in which the drive unit can be protected from the fluid or impurities in the fluid over a long term.

Preferably, the manufacturing method may further comprise forming a communication hole such that an interior of the flow passage, said interior facing the seal member, is kept in communication with an exterior of the flow passage.

The communication hole can be formed, for example, through the wall of the flow passage at a location between a bearing, on and along which the connecting member is slidably supported, and the seal member.

For example, the flow passage can be an exhaust gas recirculation passage for recirculating an exhaust gas of an internal combustion engine to an intake side, the valve member can be an exhaust gas recirculation valve capable of adjusting a flow rate of the exhaust gas through the exhaust gas recirculation passage, and the drive unit can be an electric motor for displacing the exhaust gas recirculation valve.

Preferably, the manufacturing method may further comprise fitting a fitted member in a large-diameter section arranged on an inner circumferential surface of the wall such that the seal member is held in place between a step portion of the large-diameter section and an end face of the fitted member. Alternatively, the manufacturing method may further comprises fitting two ring-shaped members in an annular groove formed in an inner circumferential surface of the wall of the flow passage such that the seal member is held in place between the ring-shaped members.

DETAILED DESCRIPTION OF THE PREFERRED EMBODIMENT

With reference to FIGS. 1 through 4, a description will hereinafter be made about the one embodiment of the present invention and its modifications.

In this embodiment, the fluid valve assembly will be described by taking an EGR valve as an example.

Figure 2:
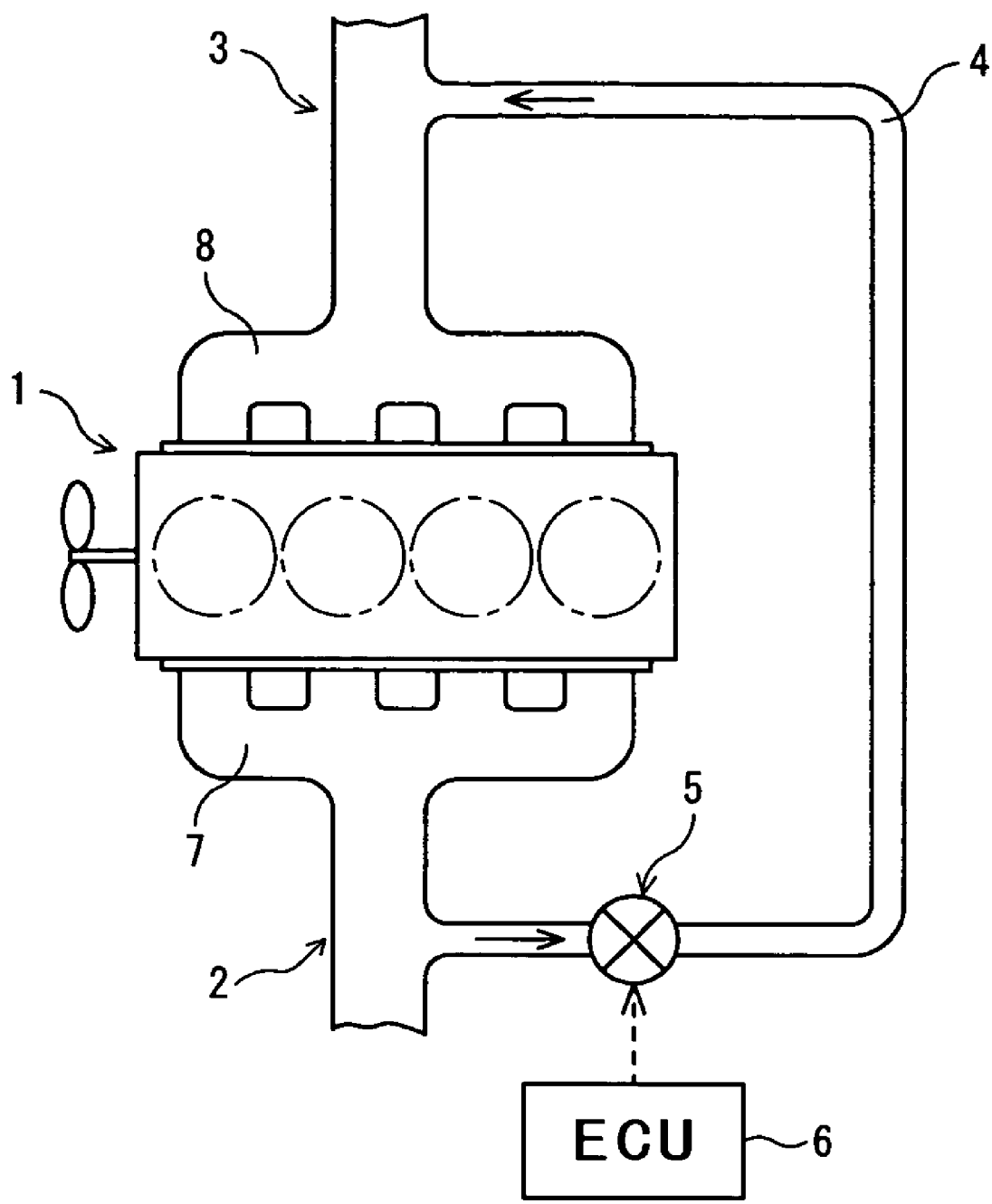
FIG. 2 is a schematic construction diagram of an automotive engine equipped with an EGR system in which the EGR valve assembly with the impurities entrance preventing structure as the one embodiment of the present invention can be used.

As illustrated in FIG. 2, an exhaust gas recirculation control system (hereinafter simply called "EGR (Exhaust Gas Recirculation) system" for the sake of brevity) is arranged, for example, in an automotive engine or the like. This EGR system is constructed of an EGR passage (exhaust gas recirculation passage) 4 arranged between an exhaust passage 2 and an intake passage of an engine (internal combustion engine) 1, an EGR valve (exhaust gas recirculation valve) 5 interposed in the EGR passage 4 at an intermediate location thereof, and an ECU (electronic control unit) 6 as a controller for adjusting the opening of the EGR valve 5. As a result of combustion in individual combustion chambers of the engine 1, an exhaust gas is produced, and is then emitted into the exhaust passage 2 from an exhaust manifold 7. Owing to the arrangement of the EGR system, a portion of the exhaust gas is recirculated depending on the opening of the EGR valve 5 through the EGR passage 4, and is fed back to the respective combustion chambers from the intake manifold 8. As the EGR valve 5, a motor-driven EGR valve is used from the viewpoint of improvements in the accuracy of control.

Figure 1:
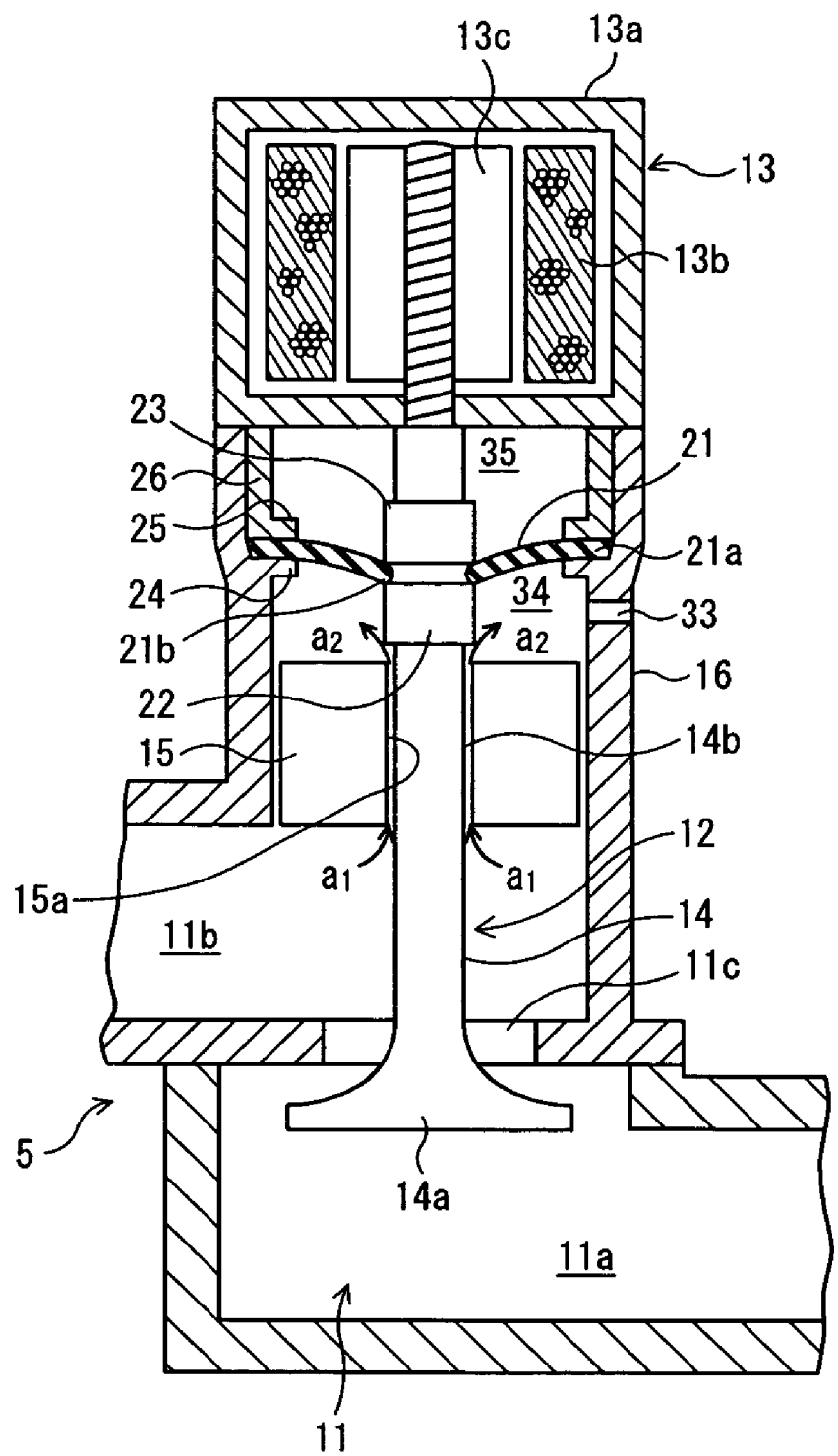
FIG. 1 is a schematic cross-sectional view of an EGR valve assembly (fluid valve assembly) with impurities entrance preventing structure as one embodiment of the present invention.

As illustrated in FIG. 1, the EGR valve 5 is provided with an exhaust gas passage 11 as a part of the exhaust gas recirculation passage 4, a valve element 12 composed of a pintle (valve member) 14a and a valve shaft 14 and interposed in the exhaust gas passage 11 at an intermediate location thereof, an electric motor 13 connected to the valve shaft 14 of the valve element 12 and adapted as a drive unit to drive the valve element 12 in an axial direction, a bearing 15 supporting thereon the valve shaft 14 of the valve element 12, and a casing 16 with the bearing 15 and valve shaft 14 accommodated therein. Incidentally, the valve shaft 14 corresponds to the connecting member that connects the pintle (valve member) 14a and the electric motor 13 together, and is arranged extending through a bore (axial bore) 15a of the bearing 15.

The exhaust gas passage 11 is composed of an upstream passage section 11a and a downstream passage section 11b, with an orifice 11c being formed therebetween such that the orifice 11c can be operatively opened or closed by the pintle 14a.

The valve element 12 is provided on an end (a lower end as viewed in FIG. 1) of the valve shaft 14 with the pintle 14a as an acting part, and an intermediate portion of the valve shaft 14 is constructed as a slide contact portion 14b that is brought into sliding contact with the bearing 15 while being supported by the bearing 15. To the opposite end (an upper end as viewed in FIG. 1) of the valve shaft 14, the electric motor 13 is connected. Incidentally, the pintle 14a is formed in mushroom-shaped configurations.

The electric motor 13 is a conventional electric motor. Inside a motor casing 13a, a coil 13b is arranged in an outer circumferential part and a metal core 13c is disposed as a rotor in an inner circumferential part. Internal threads are formed in a central portion of the metal core 13c, while external threads are formed on the opposite, i.e., upper end portion of the valve shaft 14 or a shaft member coaxially connected to the opposite, i.e., upper end portion. The internal threads on the side of the metal core 13c and the external threads on the side of the valve shaft 14 are maintained in threaded engagement to make up a translation mechanism such that the valve shaft 14 is caused to move in the axial direction when the metal core 13c rotates. By energizing the coil 13b as needed, the metal core 13c is caused to rotate as much as needed in a predetermined direction such that the valve shaft 14 can be brought to a predetermined axial location.

The pintle 14a and a portion of the valve shaft 14, said portion being on the side of the lower end of the valve shaft 14 relative to the slide contact portion 14b of the valve shaft 14, are inserted in the exhaust gas passage 11. As the pressure of the exhaust gas in the exhaust gas passage 11 becomes higher than the atmospheric pressure, the exhaust gas may leak out along the slide contact portion 14b of the valve shaft 14 from the side of the lower end of the valve shaft 14 (the side of the exhaust gas passage 11) to the side of the upper end of the valve shaft 14 (the side of the electric motor 13) as indicated by arrows a1,a2. However, a substantially disk-shaped, flexible seal member 21 which functions as a fluid entrance blocking member is arranged between the bearing 15 in the casing 16 (the wall of the passage 11) and the electric motor 13 such that the seal member 21 serves to prevent the exhaust gas, which has leaked out along the slide contact portion 14b and has entered a chamber 34, from entering the side of the electric motor 13 through a chamber 35.

The seal member 21 is formed in the substantially disk-shaped configurations (is in the form of a circular sheet), is flexible, and is provided at a central part thereof with a hole through which the valve shaft 14 extends. Its outer circumferential edge portion 21a is connected to an inner circumferential wall of the casing 16, while its inner circumferential edge portion 21b is connected to an outer circumferential wall of the valve shaft 14. Especially at these connected parts, the seal member 21 is sandwiched in a gas-tight fashion (or gas-tight and liquid-tight fashion) from both sides thereof by sandwiching members 22,23,24,25, respectively. In the case of the valve for liquids, a liquid-tight fashion is required instead of the gas-tight fashion.

Described specifically, two tubular members (sandwiching members) 22,23 having a predetermined thickness are externally fitted on the outer circumferential wall of the valve shaft 14. The inner circumferential edge portion 21b of the seal member 21 is sandwiched by (is held between) these two tubular members 22,23 such that the seal member 21 is connected in the gas-tight fashion to the outer circumferential wall of the valve shaft 14. On the inner circumferential wall of the casing 16, a first flange portion 24 is arranged extending inwardly as the sandwiching member. On a part of the casing 16, said part being located higher than the first flange portion 24 and having an enlarged inner diameter, a cylindrical member 26 is internally fitted, with a second flange portion 25 being arranged extending inwardly as the sandwiching member. The outer circumferential edge portion 21a of the seal member 21 is sandwiched (held) between these two flange portions 24,25, and is connected in a gas-tight fashion to the inner circumferential wall of the casing 16.

Figure 3:
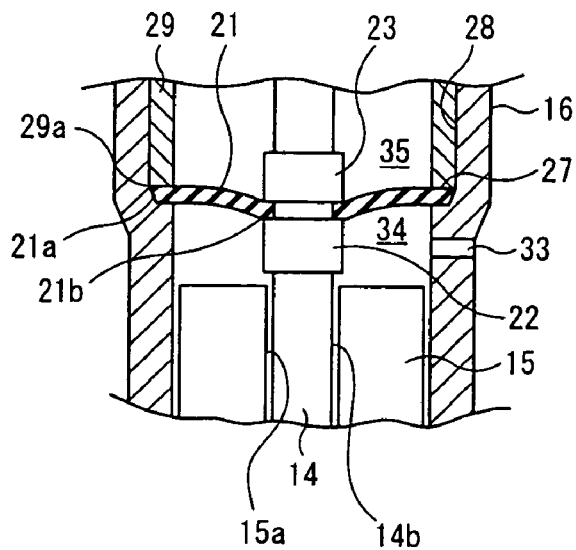
FIG. 3 is a schematic fragmentary cross-sectional view of an EGR valve assembly (fluid valve assembly) with impurities entrance preventing structure as a first modification of the one embodiment of the present invention.

As illustrated in FIG. 3, the above-described first and second flange portions 24, 25 may be omitted, and instead, a large-diameter section 28 which is provided with a step portion 27 may be formed on an inner circumferential wall of a casing 16. The outer circumferential edge portion 21a of the seal member 21 may then be sandwiched (held) in a gas-tight fashion between the step portion (sandwiching member) 27 and an end face (sandwiching member) 29a of a flange-free, cylindrical member (internally-fitted member) 29 internally fitted on the large-diameter section 28.

Figure 4:
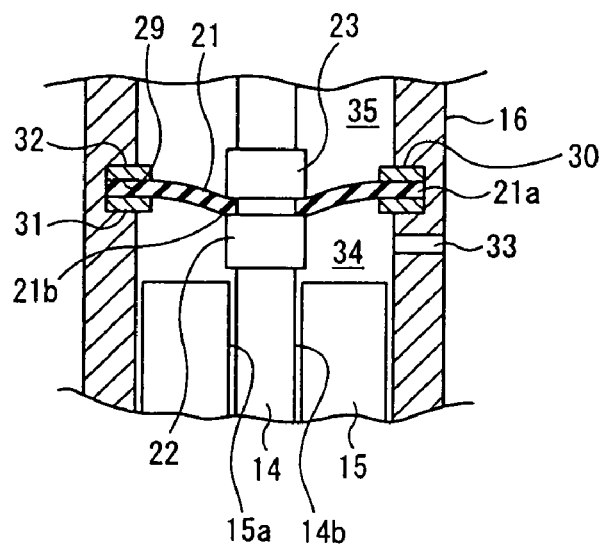
FIG. 4 is a schematic fragmentary cross-sectional view of an EGR valve assembly (fluid valve assembly) with impurities entrance preventing structure as a second modification of the one embodiment of the present invention.
Figure 5:
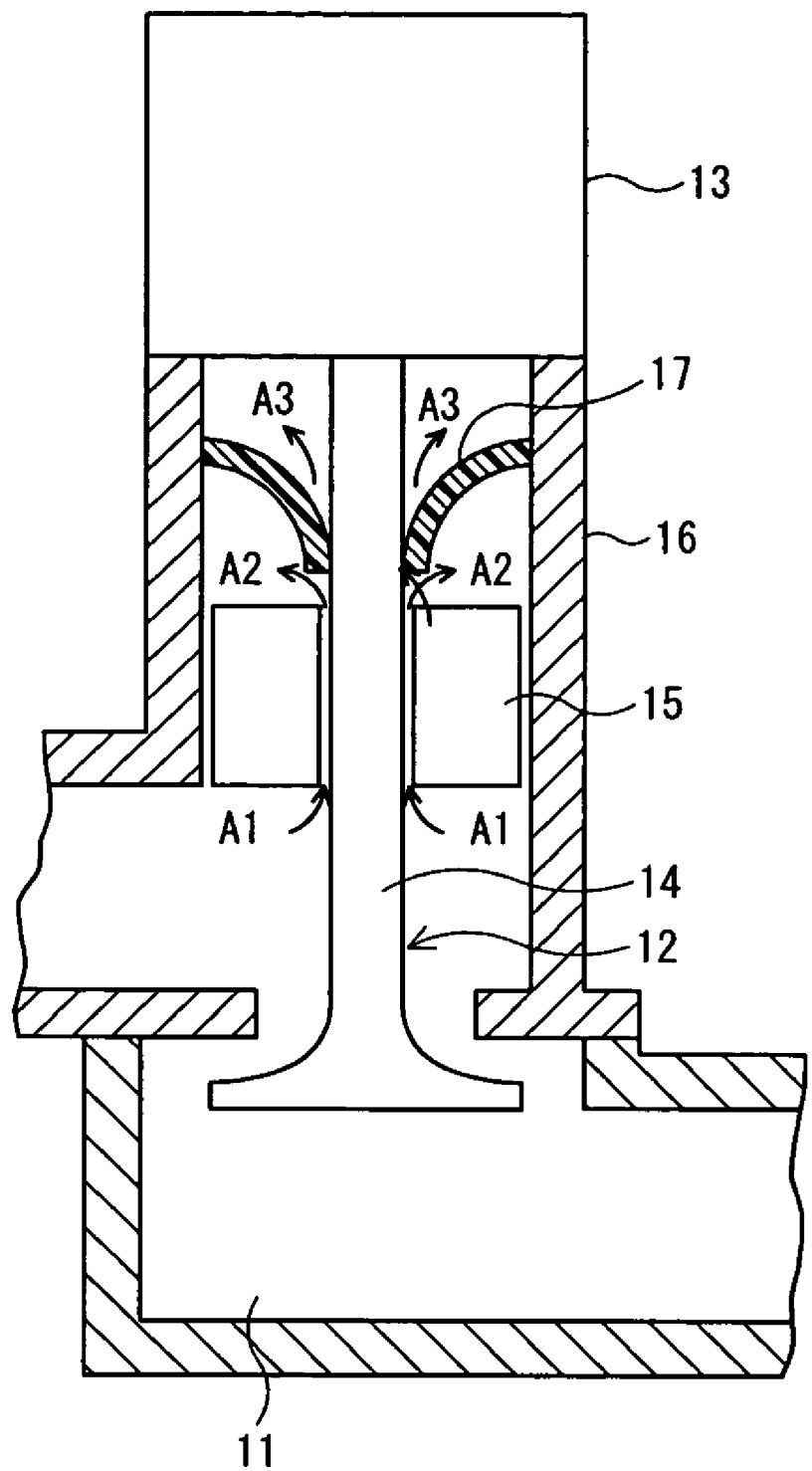
FIG. 5 is a schematic cross-sectional view of an EGR valve assembly (fluid valve assembly) with impurities entrance preventing structure according to a first conventional technique.
Figure 6:
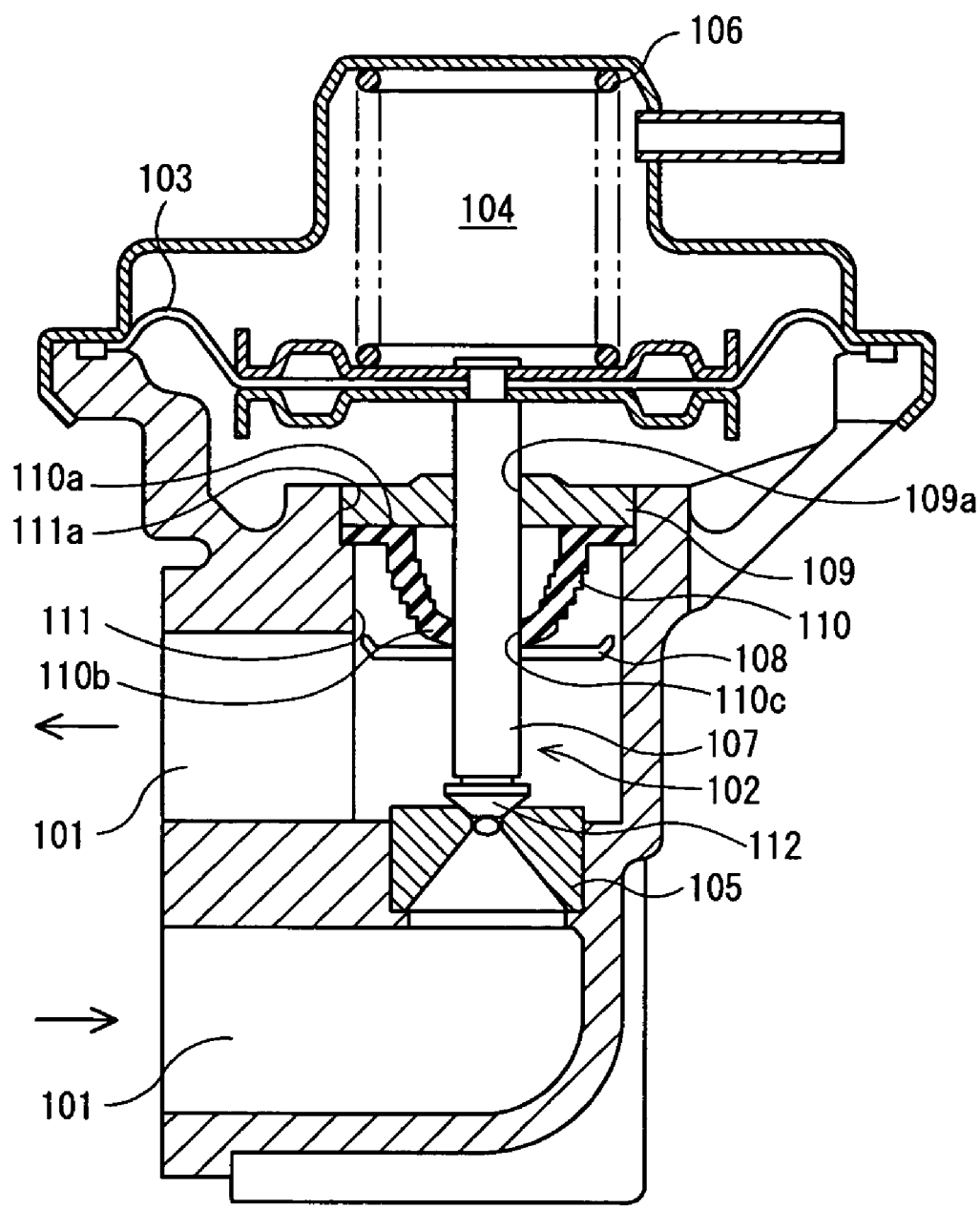
FIG. 6 is a schematic cross-sectional view of an EGR valve assembly (fluid valve assembly) with impurities entrance preventing structure according to a second conventional technique.

As an alternative, the gas-tight connection may also be assured as illustrated in FIG. 4, specifically by forming an annular groove 30 in an inner circumferential wall of a casing 16, and fitting two broken ring members (sandwiching members) 31,32, the diameters of which can be reduced through resilient deformations, in the annular groove 30 while keeping the seal member 21 sandwiched (held) at the outer circumferential edge portion 21a thereof between the two broken ring members (sandwiching members) 31,32.

As depicted in each of FIGS. 1, 3 and 4, a communication hole 33 is also formed through the casing 16 at a location between the bearing 15 and the seal member 21 to communicate the interior and exterior of the casing 16 with each other. When the exhaust gas enters the chamber 34 between the bearing 15 and the seal member 21 in the casing 16 through the clearance between the bearing 15 and the associated slide contact portion 14b of the valve shaft 14 and the internal pressure of the chamber 34 increases, the exhaust gas in the chamber 34 is automatically vented to the outside through the communication hole 33 to avoid such a situation that the exhaust gas would accumulate to high pressure in the chamber 34.

As the EGR valve assembly (fluid valve assembly) with the impurities entrance preventing structure according to the one embodiment of the present invention is constructed as described above, the EGR valve 5 is adjusted in opening as needed during an operation of the engine 1 to regulate the EGR flow rate such that the exhaust gas is rendered cleaner.

At this time, the exhaust gas may enter the chamber 34 between the bearing 15 and the seal member 21 in the casing 16 through the clearance between the slide contact portion 14b and the bearing 15. However, this chamber 34 is sealed by the seal member 21 relative to the chamber 35 on the side of the electric motor 13 so that the exhaust gas does not enter the side of the electric motor 13.

In particular, the seal member 21 is sandwiched (held) at the outer circumferential edge portion 21a and inner circumferential edge portion 21b thereof by means of the cylindrical member and step portion and the tubular members, respectively, and is connected to the inner circumferential wall of the casing 16 and the outer circumferential wall of the valve shaft 14 in a gas-tight fashion, respectively. The seal member 21, therefore, does not include any sliding part and moreover, is free of the potential problem of separation as experienced in the case of the connection by mere fixing, so that the seal member 21 is facilitated to assure high sealing performance (gas tightness) at the connected parts over a long term. Even when the exhaust gas enters the chamber 34 along the slide contact portion 14b of the valve shaft 14 as shown in FIG. 1 (see arrows a1,a2), this exhaust gas is blocked by the seal member 21 so that the electric motor 13, the element to be protected, can be surely protected from the exhaust gas or from the impurities in the exhaust gas.

The seal member 21 is required to undergo an elastic deformation by following each axial movement of the valve shaft 14 of the valve element 12. As the seal member 21 includes no sliding part and is free of the potential problem of wearing, it is unnecessary to use a high-class slidable material having strong abrasion resistance (for example, "TEFLON" or the like). Any material can be used insofar as it is equipped with certain degrees of heat resistance and oil resistance and also with flexibility sufficient to avoid exerting a resistance to the movement of the valve shaft 14. For example, general rubbers such as diaphragm materials (e.g., fluorosilicone rubber) employed in pneumatic EGR valves can be used.

The communication hole 33 is formed through the casing 16 at the location between the bearing 15 and the seal member 21 to communicate the interior and exterior of the casing 16 with each other. Even when the exhaust gas enters the chamber 34 between the bearing 15 and the seal member 21 in the casing along the slide contact portion 14b, the exhaust gas in the chamber 34 is therefore automatically vented to the outside through the communication hole 33 as the internal pressure of the chamber 34 increases. Accordingly, the exhaust gas does not accumulate to high pressure in the chamber 34.

The chamber 34 on the side of the slide contact portion 14b, therefore, does not become significantly high in pressure relative to the chamber 35 on the side of the electric motor 13 with the seal member 21 being located therebetween in the casing 16. A pressure difference, if any, is not so large as inducing the exhaust gas to enter the chamber 35 from the chamber 34 along the tightly-connected outer circumferential edge portion 21a and inner circumferential edge portion 21b of the seal member 21. In this respect too, the electric motor 13 can be surely protected from the exhaust gas or the impurities in the exhaust gas.

In addition, the seal member (fluid entrance blocking member) 21 is formed in the substantially disk-shaped configurations (is in the form of a circular sheet), that is, in planar, extremely simple configurations, thereby bringing about a still further merit that the production, assembly and management of the seal member 21 can be conducted with ease.

The operation and advantageous effects of the EGR valve assembly (fluid valve assembly) with the impurities entrance preventing structure as the one embodiment of the present invention as shown in FIG. 1 have been described in the above. These operation and advantageous effects equally apply to its modifications depicted in FIGS. 3 and 4, respectively.

The one embodiment and its first and second modifications have been described in the above. It is, however, to be noted that the present invention is not limited to such embodiment and modifications but can be practiced by modifying them in various ways to extent not departing from the spirit of the present invention.

For example, the configurations of the seal member (fluid entrance blocking member) 21 are not limited to the configurations in the above-described embodiment and modifications. To permit following the movement of the valve shaft 14 more easily, the seal member 21 can be formed into more three-dimensional configurations, for example, by providing it with bellows.

The above-described embodiment and modifications are each provided with both of the feature (first feature) that the seal member (fluid entrance blocking member) 21 is sandwiched at both the outer circumferential edge portion 21a and the inner circumferential edge portion 21b by the sandwiching members and the feature (second feature) that the communication hole 33 is arranged to vent the exhaust gas from the chamber 34. Even if only one of these features is equipped, the advantageous effects of the present invention can still be brought about to certain satisfactory extent.

The embodiment and its modifications were described by taking the EGR valves as examples. The present invention is, however, not limited to such EGR valves. When applied to various fluid valve assemblies for gases or liquids each of which includes in the vicinity of a movable member a drive means (a means corresponding to the EGR valve drive motor) to be protected from a fluid or from impurities in a fluid, similar advantageous effects can be brought about as in the above-described embodiment and modifications.

The present invention can be widely applied to fluid valve assemblies, led by EGR valves, of the type that a drive means (a means corresponding to the EGR valve drive motor) to be protected from a fluid or from impurities in a fluid exists in the vicinity of a valve element as a movable member, and can surely protect their drive means from a fluid or from impurities in a fluid.

This application claims the priority of Japanese Patent Application 2003-317162 filed Sep. 9, 2003, which is incorporated herein by reference.

What is claimed is:

1. A fluid valve assembly comprising:
   a valve member displaceably arranged in a flow passage through which a fluid is allowed to pass;
   a drive unit arranged outside said flow passage;
   a connecting member extending through a bore formed in a wall of said flow passage, and connected at an end thereof to said valve member and at an opposite end thereof to said drive unit;
   a seal member arranged in gas- or water-tight relations with said wall of said flow passage and said connecting member and made of a flexible material such that said seal member does not interfere with a displacement of said valve member when valve member is driven by said drive unit; and
   a communication hole formed such that an interior of said flow passage, said interior facing said seal member, is kept in communication with an exterior of said flow passage.

2. A fluid valve assembly according to claim 1, further including a bearing that slidably supports said connecting member, wherein said communication hole is formed through said wall of said flow passage at a location between said bearing, and said seal member.

3. A fluid valve assembly according to claim 1, wherein:
said flow passage is an exhaust gas recirculation passage for recirculating an exhaust gas of an internal combustion engine to an intake side;
said valve member is an exhaust gas recirculation valve or adjusting a flow rate of the exhaust gas through said exhaust gas recirculation passage; and
said drive unit is an electric motor for displacing said exhaust gas recirculation valve.

4. A fluid valve assembly according to claim 1, wherein said flow passage has a large-diameter section with a step portion, and further including a fitted member disposed at said large-diameter section, said seal member being held in place between said step portion and an end face of said fitted member.

5. A fluid valve assembly according to claim 1, wherein said flow passage includes an annular groove formed in an inner circumferential surface of the wall thereof, and further including two ring-shaped members disposed in said annular groove, said seal member being held in place between two ring-shaped members.

6. A fluid valve assembly according to claim 1, wherein the flow passage is a casing of an EGR value assembly.

7. A fluid valve assembly according to claim 1, wherein the connecting member includes an annular groove that positively engages the seal member.

8. A method of manufacturing a fluid valve assembly comprising the steps of:
displaceably arranging a valve member in a flow passage through which a fluid is allowed to pass;
arranging a drive unit outside said passage;
arranging a connecting member to extend through a bore formed in a wall of said flow passage, and connecting said connecting member at an end thereof to said valve member and at an opposite end thereof to said drive unit;
arranging a seal member in gas- or water-tight relations with said wall of said flow passage and said connecting member such that said seal member does not interfere with a displacement of said valve member when said valve member is driven by said drive unit,
forming a communication hole such that an interior of said flow passage, said interior facing said seal member, is kept in communication with an exterior of said flow passage.

9. A manufacturing method according to claim 8, further including the step of providing a bearing that slidably supports said connecting member, wherein said communication hole is formed through said wall of said flow passage at a location between said bearing, and said seal member.

10. A manufacturing method according to claim 8, wherein:
said flow passage is an exhaust gas recirculation passage for recirculating an exhaust gas of an internal combustion engine to an intake side;
said valve member is an exhaust gas recirculation valve or adjusting a flow rate of the exhaust gas through said exhaust gas recirculation passage; and
said drive unit is an electric motor for displacing said exhaust gas recirculation valve.

11. A manufacturing method according to claim 8, wherein said flow passage includes a large-diameter section with a step portion, further including the step of providing a fitted member disposed at said large-diameter section said seal member being held in place between said step portion of said large-diameter section and an end face of said fitted member.

12. A manufacturing method according to claim 8, wherein said flow passage includes an annular groove formed in an inner circumferential surface of the wall thereof, and further including the step of providing two ring-shaped members in said annular groove said seal member being held in place between said ring-shaped members.

13. A method according to claim 8, wherein the flow passage is a casing of an EGR value assembly.

14. A method according to claim 8, wherein the connecting member includes an annular groove that positively engages the seal member.

* * * * *